Figure 1:
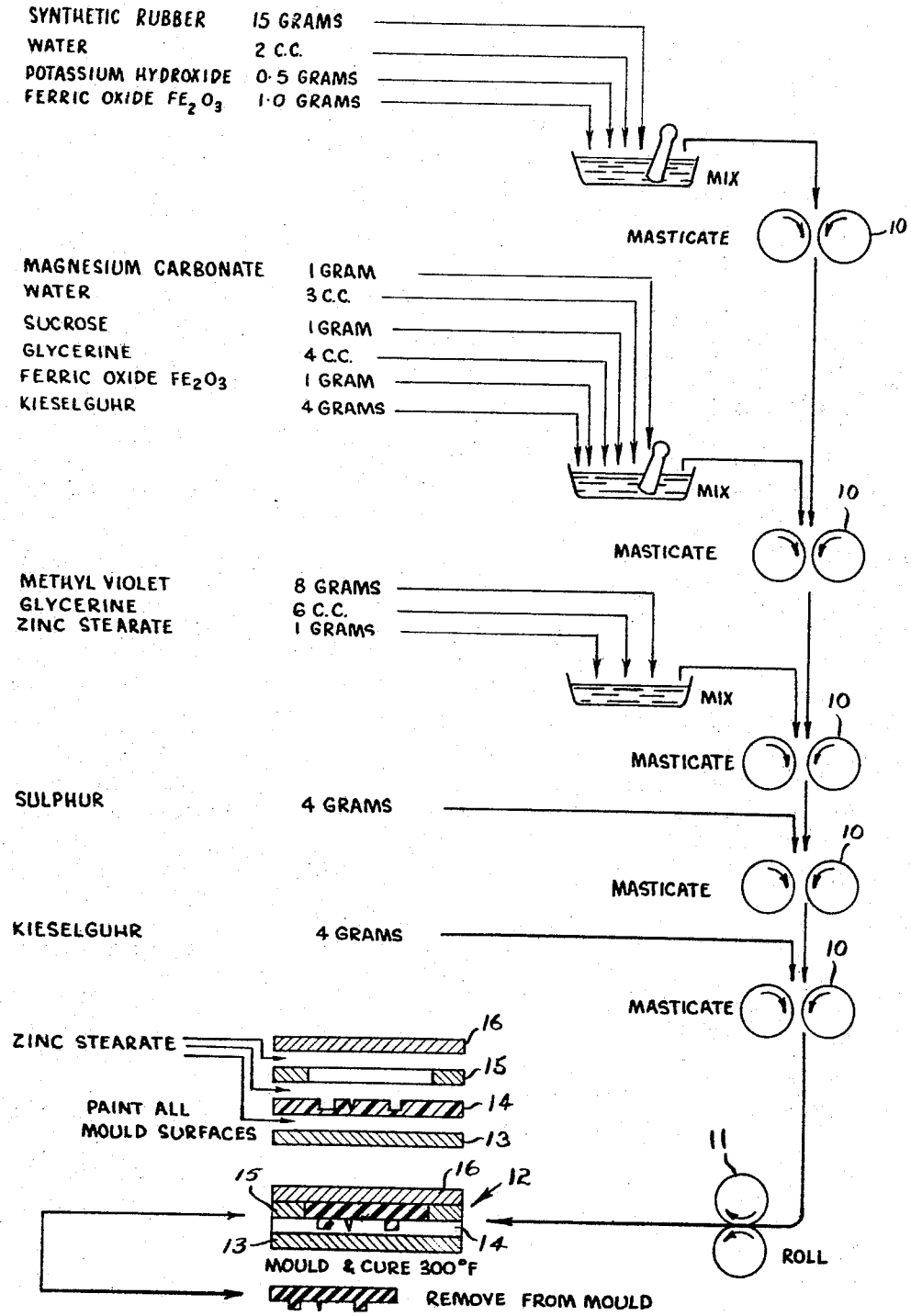

July 18, 1967        F. A. DEUTER        3,331,794

SELF-INKING MATERIAL

Filed April 16, 1963        3 Sheets-Sheet 2

| Ingredient | Amount |
|---|---|
| WATER | 1.5 C.C. |
| POTASSIUM HYDROXIDE | 0.5 GRAMS |
| FERRIC OXIDE $Fe_2O_3$ | 1.0 GRAMS |
| MAGNESIUM CARBONATE | 0.5 GRAMS |

→ MIX

| SYNTHETIC RUBBER | 20 GRAMS |
|---|---|

→ MASTICATE (10)

| GLYCERINE | 5 C.C. |
|---|---|
| SUGAR | 0.5 GRAMS |
| GRAPHITE | 1.5 GRAMS |
| KIESELGUHR | 3 GRAMS |

→ MIX → MASTICATE (10)

| STEARIC ACID | 17 PARTS |
|---|---|
| GLYCERINE | 88 PARTS |

→ WARM & STIR

| 10% AMMONIA | 3 PARTS |
|---|---|
| DISTILLED WATER | 12 PARTS |

→ WARM & STIR → COOL 10 GR.

| METHYL VIOLET | 6 GRAMS |
|---|---|

→ MIX

| ZINC STEARATE | 1 GRAM |
|---|---|
| KIESELGUHR | 2 GRAMS |

→ MIX → MASTICATE (10)

| SULPHUR | 6 GRAMS |
|---|---|

→ MASTICATE (10)

| UREA | 3 GRAMS |
|---|---|
| WATER | 3 C.C. |

→ MIX

| MAGNESIUM CARBONATE | 1 GRAM |
|---|---|
| KIESELGUHR | 2 GRAMS |

→ MIX → (10)

FIG 2

July 18, 1967  F. A. DEUTER  3,331,794
SELF-INKING MATERIAL

Filed April 16, 1963  3 Sheets-Sheet 3

| SYNTHETIC RUBBER | 17 GRAMS |
| NATURAL RUBBER | 3 GRAMS |

MASTICATE 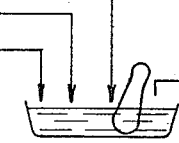

| WATER | 1 C.C. |
| POTASSIUM HYDROXIDE | 0·5 GRAMS |
| FERRIC OXIDE $Fe_2O_3$ | 1·5 GRAM |

GRIND & MIX

MASTICATE 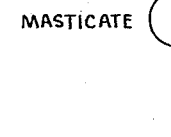

| GLYCEROL | 3 C.C. |
| SUGAR | 0·5 GRAMS |
| FERRIC OXIDE $Fe_2O_3$ | 0·5 GRAMS |
| GRAPHITE | 1·5 GRAM |
| KIESELGUHR | 3 GRAMS |

GRIND & MIX

MASTICATE 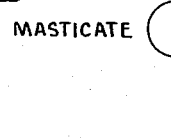

| GLYCEROL | 18 C.C. |
| WATER | 21 C.C. |
| UREA | 30 GRAMS |
| AMMONIUM CARBONATE | 0·6 GRAMS |

HEAT & MIX

COOL 8 C.C.

| METHYL VIOLET | 10 GRAMS |

GRIND & MIX

| STEARIC ACID | 17 GRAMS |
| GLYCEROL | 70 C.C. |
| 10% AMMONIA SOLUTION | 3 C.C. |
| WATER | 12 C.C. |

MIX & HEAT

COOL 6 GRAMS

| ZINC STEARATE | 0·2 GRAMS |
| SULPHUR | 6 GRAMS |
| ACCELERATOR | 1 GRAM |

GRIND & MIX

MASTICATE 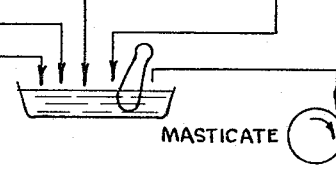

FIG 3

United States Patent Office 3,331,794
Patented July 18, 1967

3,331,794
SELF-INKING MATERIAL
Frederich A. Deuter, Hilton, South Australia, Australia, assignor of one-half to John Foundas, South Australia, Australia
Filed Apr. 16, 1963, Ser. No. 273,462
Claims priority, application Australia, Apr. 19, 1962, 16,825/62; Sept. 18, 1962, 22,282/62
12 Claims. (Cl. 260—5)

This invention relates to a material of the type used for date stamps, registering finger prints, and other similar purposes, which is arranged to contain a certain quantity of dye so that the need for an inking pad is eliminated.

One of the problems with rubber stamps of the type which are used generally is the need for the use of a stamp pad to impart a film of ink to the surface of the rubber stamp before the rubber stamp is applied to the paper. Use of such a stamp pad is inconvenient in that it needs to be purchased and retain, and secondly, that it slows up the stamping operation in the instance of a number of similar impressions being required to be applied in a short period of time. Quite clearly the design of machines which utilise rubber stamps and the like can be very much simplified if the rubber stamps contain their own ink.

A further object of this invention is to provide a self-inking material which will tend to remain moist so as to impart an impression even under hot, dry conditions, but which will not tend to "flood" under moist, humid conditions.

In its simplest form this invention may be said to consist of a self-inking material which comprises rubber, a dye dispersed throughout the rubber, hygroscopic substances dispersed throughout the rubber, a filler dispersed throughout the rubber, and a release agent dispersed throughout the rubber.

It will be seen that this invention makes possible a self-inking material which is mechanically tough and will hold a large quantity of dye, so that the self-inking material may be used for an extended period of time without the need for replacement.

It will also be seen from this specification that this invention provides a means whereby a self-inking material which is extremely stable both before and after vulcanising can be produced, and which is easy to use in a standard vulcanising set utilising resin based moulds as commonly used in the rubber stamp industry.

It will be obvious to a skilled chemist that various types of rubber can be used in this invention, that the methyl violet dye described hereunder can be replaced with other dyes, that a wide variety of hygroscopic substances are available for selection which are suitable for dispersal throughout rubber, and that various fillers and release agents can be used. However, for the invention to be more clearly understood, it is described hereunder in some detail with reference to three separate embodiments with reference to and illustrated in the accompanying drawings in which:

FIG. 1 is a diagrammatic representation of a first embodiment indicating the steps of producing a rubber stamp pad, FIG. 2 is a diagrammatic representation showing the steps of producing self-inking material according to a second embodiment, and FIG. 3 is a diagrammatic representation of the steps for producing a self-inking material according to a third embodiment.

Referring to the first embodiment, quantities indicated are suitable for laboratory purposes, but it will be appreciated that they can be increased proportionally for commercial production and also varied to meet the different requirements due to climatic conditions, rate of usage of ink and the like.

In this first embodiment which is illustrated in FIG. 1, 15 grams of synthetic isoprene rubber is mixed with 2 cc. of water, 0.5 gram of potassium hydroxide and 1.0 gram of ferric oxide ($Fe_2O_3$). The water functions as a solvent for the potassium hydroxide and is absorbed into the rubber itself by mastication which is assisted by the ferric oxide, the potassium hydroxide functions as a catalyst to catalyse the glycerine which is added later to form complex resins, while the ferric oxide is hygroscopic, assists penetration of the potassium hydroxide solution, and toughens the rubber to stand penetration of glycerine which otherwise breaks down rubber.

The materials are masticated in a masticator 10 for a period of time, after which 1 gram of magnesium carbonate (levis), 3 cc. of water 1 gram of sucrose, 4 cc. of glycerine, 1 gram of ferric oxide and 4 grams of kieselguhr are added while mastication continues. The function of the ferric oxide and magnesium carbonate is to assist mastication. The glycerine and sucrose form an extremely hygroscopic mix, the sucrose increases the hygroscopic effect and assists in freeing of ink which is subsequently added, the glycerine is hygroscopic, carries moisture into the rubber, and provides an ink-retaining medium, while the kieselguhr functions as a filler to form body, and absorbs the glycerine and methyl violet subsequently added to form a mixture capable of retaining the ink content and releasing it on the presence of moisture. If desired a little gelatin may also be used here, but it is found that gelatine causes swelling in the rubber after it is vulcanised, and therefore the use of gelatine does not form part of this embodiment.

The mastication is again continued for a period of time, after which 8 grams of methyl violet, 6 cc. of glycerine and 1 gram of zinc stearate are added. The zinc stearate has the effect of assisting mastication of the additional glycerine with the methyl violet, prevents tackiness with respect to rollers and the rolling of the material, and assists in releasing the rubber mixture when moulded. The methyl violet, of course, functions to provide the ink for the mixture and also acts as an accelerator. It is noted that the complete mixture is self-curing to quite an extent due to the presence of the methyl violet, when the final product is exposed to air.

Mastication is further continued, and 4 grams of sulphur are then added, and mastication is further continued for a period of time. A still further 4 grams of kieselguhr is then masticated in to absorb any surplus moisture and glycerine, and thus render the mixture (which is plasticised by this stage) easier to handle.

The mixture is then fed through rollers 11 which calender the plasticised mass, and portion of the mixture is placed into a mould 12. The mould 12 consists of a base plate 13 of mild steel, a plastic based mould plate 14 which is used in accordance with the ordinary practice of moulding rubber stamps, a marginal plate 15 which surrounds the plasticised mass wtihin the mould 12, and a top plate 16. All these plates are themselves coated with the zinc stearate which functions as a release agent. The rubber is moulded under pressure for a period of from four to five minutes at a temperature of 300° Fahrenheit. By using mild steel plates and zinc stearate, it is found that the moulded article is readily released from the mould and retains sharp characteristics which are a true complementary representation of the configuration of the face of the mould. It will be seen that the thickness of the plate 15 governs the thickness of the final product when removed from the mould, and it is found in practice that this thickness for a rubber stamp needs to be about 3 millimeters.

It is found that the completed stamp after moulding should be left for a period of from three to five days before being used, after which it will continue to re-ink itself without the need to apply it to an ink-containing pad.

Color changes in the inking can be made if desired by utilising dyes other than methyl violet.

According to a further embodiment which is illustrated in FIG. 2, a mixture of ammonium stearate and glycerine is first made as follows:

17 parts by weight of stearic acid (commercial) are warmed until melted and then have added to them 88 parts by weight of glycerine, and the mixture is vigorously stirred.

3 parts of dilute ammonia (10%) are then mixed with 12 parts of distilled water, and this is mixed in with the glycerine and stearic acid while continuing to stir and keeping the temperature so that the stearic acid remains melted until the ammonia is added. The heat is then removed but the product is kept stirred until eventually a paste is formed. In this embodiment the commercial stearic acid used contained only about 45% of pure stearic acid, with about 5% of oleic and 50% of palmitic acids.

Five separate mixtures were then made as follows:

*Mixture No. 1.*—Into 1.5 cc. of water, 0.5 gram of potassium hydroxide (KOH) was thoroughly dissolved, 1 gram of ferric oxide ($Fe_2O_3$) and 0.5 gram of magnesium carbonate ($MgCO_3$) (levis) were added.

*Mixture No. 2.*—5 cc. of glycerine and 0.5 gram of sugar were thoroughly mixed, and 1.5 grams of graphite and 3 grams of kieselguhr were added and mixed.

*Mixture No. 3.*—10 grams of the paste containing ammonia with glycerine and stearic acid was mixed with 6 grams of methyl violet, and then mixed with 1 gram of zinc stearate and 2 grams of kieselguhr.

*Mixture No. 4.*—Mixture No. 4 consists solely of 6 grams of sulphur.

*Mixture No. 5.*—3 grams of urea crystals were thoroughly dissolved in 3 cc. of water, 1 gram of magnesium carbonate ($MgCO_3$) (levis) was added and 2 grams of kieselguhr were then added.

The mixtures were then milled with synthetic rubber (synthetic polyisoprene) as follows:

20 grams of synthetic polyisoprene were masticated with the mixtures being added in the order specified above, No. 1 first and in sequence until No. 5 last.

It has been found that the amount of synthetic polyisoprene may be varied to give variable inking strengths to the rubber mixture, and after milling, the rubber mixture can be vulcanised at 300° F. for 4 minutes keeping it enclosed as described above.

The above two embodiments have been found to produce self-inking material which is very satisfactory in general use, but certain improvements have been found by utilising the third embodiment which is described hereunder with reference to FIG. 3. Among these improvements has been a toughening of the rubber, a more rapid re-inking, so that the material can be used for a rubber stamp to apply impressions in quick succession, and less tendency to "flood."

In this third embodiment 15 grams of synthetic rubber (synthetic polyisoprene) are mixed with 3 grams of natural rubber and these two ingredients are thoroughly masticated in the masticator 10.

Three mixtures are prepared in the following proportions:

*Mixture (a).*—Water $H_2O$ 1 cc., potassium hydroxide KOH 0.5 gram, ferric oxide $Fe_2O_3$ 1.5 grams.

*Mixture (b).*—17 grams of stearic acid are gently heated until melted and then mixed with 70 cc. of glycerol, keeping the mixture in a melted state. 3 cc. of 10% aqueous ammonia solution are then mixed in with 12 cc. of water and this in turn is mixed in with the stearic acid and glycerol mixture until the mass becomes homogeneous. The mass is then allowed to cool whereupon the mixture forms a thick paste.

*Mixture (c).*—18 cc. of glycerol, 21 cc. of water, 30 grams of urea, and 0.6 gram of ammonium carbonate are mixed together, and the mixture is gently heated until all salts are in solution.

The mixture (a) is then added to the masticated rubber mixture.

A further mixture is then made between 3 cc. of glycerol, 0.5 gram of sugar, 0.5 gram of ferric oxide, 1.5 grams of graphite and 3 grams of kieselguhr, and after this has been thoroughly mixed it is masticated in with the rubber together with the mixture (a) in the masticator 10.

8 cc. of mixture (c) are then mixed with 10 grams of methyl violet, 6 grams of mixture (b) 0.2 grams of zinc stearate, 6 grams of sulphur and 1 gram of accelerator (Vulkacit P (piperidinium pentamethylene dithio carbamate) as manufactured by Farbenfabriken Bayer A/G, Leverkusen, Germany).

The above are all mixed together in the order specified, and when completely mixed together are added to the mixture being masticated.

The potassium hydroxide appears to act as a catalyst forming various complex resins of the glycerol.

The ferric oxide is hygroscopic and appears to toughen the rubber mixture. It also acts as a dispersal agent for the potassium hydroxide.

The stearic acid mixture is also hygroscopic and assists in keeping the rubber moist. It also assists in the curing of the rubber and in the absorption of the dye in an available form.

The urea mixture is very hygroscopic and also assists in the absorption of the dye in an available form.

The glycerol mixture with graphite, sugar, ferric oxide and kieselguhr serves to prepare the rubber for the masticating and dispersal of the dye mixture, and also to assist the dye absorption. The graphite serves to toughen the rubber when it is vulcanised and also prevents the rubber from getting tacky after it has been vulcanised. It also keeps "working" within the rubber as it is used in the form of a stamp and tends to improve the inking of the rubber when so used.

The kieselguhr acts to assist the mastication and also functions as a filler.

The zinc stearate improves the ink mixture and also assists in the preventing of the rubber from getting tacky. It further assists vulcanisation to some extent.

The sulphur is of course for the purpose of vulcanisation and also appears to assist in rendering the dye mixture available on contact with moisture from the atmosphere, together with the urea mixture.

It is not necessary to adhere strictly to the proportions stated in this embodiment to obtain a self-inking rubber material, and other materials may be used if desired. For example magnesium carbonate, sodium lactate (which is very hygroscopic), gelatin (in small quantities only), and sodium stearate, but it will be found that the substances in the proportion stated in this third embodiment appear to give very good self-inking rubber material.

The material may be vulcanised at about 300 degrees F. in approximately five minutes if kept sealed from contact with the air.

In air the rubber is self-curing to some extent but a much better moulding is produced when the rubber is vulcanised out of contact with the air and under pressure. This can be achieved as in the first embodiment.

It might be noted that in general it is desirable to maintain the temperature of the masticating rollers at about 90° F. Thus for example in the third embodiment it is found desirable that a temperature of 90° F. should be maintained during the processes of masticating the rubber for the ferric oxide-potassium hydroxide mixture and the glycerol-graphite mixture, but to cool the rollers to room temperature before adding the final substance which includes the methyl violet.

Different colors may be obtained by using different dyes in place of the methyl violet without otherwise altering the procedure in any other way. The following are typical examples:

Red can be obtained by using "magenta" dye.

Blue can be obtained by using "methylene blue" dye.

Results have also been obtained by using "bronze scarlet" for red and "Astra blue" for blue, and "nigrosine black." Nigrosine black however was inferior to the other dyes mentioned.

The formulas for the first three dyes and the accelerator mentioned are as follows:

*Methyl Violet.*—Methylrosaniline chloride.

*Magenta.*—(Fuchsin) a mixture of rosaniline and pararosaniline hydrochlorides.

*Methylene Blue.*—Methylthionine chloride $$(C_{16}H_{18}N_3SCl)_2 \cdot ZnCl_2 \cdot H_2O$$

*Accelerator.*—Piperidinium pentamethylene dithiocarbamate.

It is found that the mixture referred to as mixture (*b*) in the third embodiment is suitable as a release agent for application to the dyes and moulds before moulding, but it is preferred that the release agent should be without urea.

It is found that the rubber as mixed before vulcanising is extremely hydroscopic and it is therefore desirable that it should be kept from contact with the air, for example by storing in polyethylene bags.

What I claim is:

1. A self-inking material comprising rubber selected from the group consisting of natural rubber, synthetic polyisoprene, and a mixture of natural rubber and synthetic polyisoprene, said rubber containing:
   (I) the following materials dispersed throughout the rubber, an organic dye; hygroscopic substances including glycerol present in sufficient amount to retain moisture and provide an ink-retaining medium; discrete filler materials inert with respect to said rubber, and a release agent present in sufficient amount to prevent tackiness of the material, comprising a fatty acid material or salt thereof dispersed throughout the rubber, and
   (II) potassium hydroxide in said rubber present in sufficient amount to catalyze formation of dye retention resin molecules within the rubber, the dye retention resin molecules releasing dye upon absorption of atmospheric moisture into the rubber by the hygroscopic substances.

2. A self-inking material comprising rubber selected from the group consisting of natural rubber, synthetic polyisoprene, and a mixture of natural rubber and synthetic polyisoprene, said rubber containing
   (I) the following materials dispersed throughout the rubber, an organic dye; hygroscopic substances, including glycerol, present in sufficient amount to retain moisture and provide an ink-retaining medium; discrete filler materials inert with respect to said rubber, and a release agent present in sufficient amount to prevent tackiness of the material comprising a fatty acid material or salt thereof dispersed throughout the rubber, and
   (II) potassium hydroxide within the rubber present in sufficient amount to catalyze reaction of the rubber and glycerol to form dye retention resin molecules thereby rendering the rubber dye retaining, the dye retention resin molecules releasing dye upon absorption of atmospheric moisture into the rubber by the hygroscopic substances.

3. A self-inking material comprising rubber selected from the group consisting of natural rubber, synthetic polyisoprene, and a mixture of natural rubber and synthetic polyisoprene, said rubber containing
   (I) the following materials dispersed throughout the rubber, an aniline dye; hygroscopic substance present in sufficient amount to retain moisture and provide an ink-retaining medium including glycerol and ferric oxide or mixtures thereof; filler materials inert with respect to the rubber; and a release agent present in sufficient amount to prevent tackiness of the material from the group of stearic acid or a stearate dispersed, and
   (II) potassium hydroxide within the rubber present in sufficient amount to catalyze reaction of the rubber and glycerol to form dye retention resin molecules thereby rendering the rubber dye retaining, the dye retention resin molecules releasing dye upon absorption of atmospheric moisture into the rubber by the hygroscopic substances.

4. A self-inking material comprising synthetic polyisoprene, an aniline dye; hygroscopic substances present in sufficient amount to retain moisture and provide an ink-retaining medium including ferric oxide, glycerol, sucrose and urea; filler materials including kieselguhr and graphite; a release agent present in sufficient amount to prevent tackiness of the material including zinc stearate; sulphur present in sufficient amount to allow vulcanization, dispersed throughout the isoprene, and potassium hydroxide present in sufficient amount to catalyze formation of dye retention resin molecules within the synthetic polyisoprene.

5. A self-inking material comprising synthetic polyisoprene, an aniline dye; hygroscopic substances present in sufficient amount to retain moisture and provide an ink-retaining medium including ferric oxide, glycerol, sucrose and urea; filler materials including kieselguhr and graphite; a release agent present in sufficient amount to prevent tackiness of the material including zinc stearate and stearic acid; sulphur present in sufficient amount to allow vulcanization; an accelerator dispersed throughout the synthetic polyisoprene, and potassium hydroxide present in sufficient amount to catalyze formation of dye retention resin molecules within the synthetic polyisoprene.

6. A self-inking material comprising rubber consisting of a mixture of natural rubber and synthetic polyisoprene,
   a first homogeneous mixture containing potassium hydroxide present in sufficient amount to catalyze formation of dye retention resin molecules within the rubber and a hygroscopic substance present in sufficient amount to retain moisture and provide an ink-retaining medium,
   a second homogeneous mixture containing glycerol, ferric oxide, and filler material,
   a third homogeneous mixture comprising a first sub-mix which itself comprises glycerol and urea; a second sub-mix which comprises the first said sub-mix together with an analine dye; a third sub-mix which itself comprises stearic acid and an aqueous ammonia solution; and zinc stearate, sulphur present in sufficient amount to allow vulcanization and an accelerator, all said homogeneous mixtures being dispersed throughout the rubber.

7. A self-inking material comprising rubber consisting of a mixture of natural rubber and synthetic polyisoprene,
   a first homogeneous mixture containing water, potassium hydroxide present in sufficient amount to catalyze formation of dye retention resin molecules within said mixture, and ferric oxide,
   a second homogeneous mixture containing glycerol, sucrose, ferric oxide, graphite and kieselguhr, and
   a third homogeneous mixture comprising a first sub-mix which itself contains glycerol, water, urea and ammonium carbonate;
   a second sub-mix which contains the said first sub-mix together with methyl violet;
   a third sub-mix which itself contains stearic acid, glycerol, aqueous ammonia solution and water; and zinc stearate, sulphur present in sufficient amount to allow vulcanization and accelerator, all said homogeneous mixtures being dispersed throughout the rubber.

8. A self-inking material comprising rubber consisting of a mixture of natural rubber and synthetic polyisoprene,
   a first homogeneous mixture containing 1 part by weight of water, ½ part by weight of potassium hydroxide and 1½ parts by weight of ferric oxide,
   a second homogeneous mixture containing 3½ parts by weight of glycerol, 1½ parts by weight of graphite and 3 parts by weight of kieselguhr, and
   a third homogeneous mixture comprising 8 parts by weight of a first sub-mix which itself contains 22 parts by weight of glycerol, 21 parts by weight of water, and 30 parts by weight of urea;
   a second sub-mix which itself comprises the said 8 parts by weight of the first sub-mix together with 10 parts by weight of methyl violet; 6 parts by weight of a third sub-mix which itself comprises 17 parts by weight of stearic acid, 80 parts by weight of glycerol, 3 parts by weight of 10% aqueous ammonia solution and 12 parts by weight of water; and 0.2 part by weight of zinc stearate, 6 parts by weight of sulphur and 1 part by weight of accelerator, all said homogeneous mixtures being dispersed throughout the rubber.

9. A self-inking material comprising rubber consisting a mixture of natural rubber and synthetic polyisoprene,
   a first homogeneous mixture containing 1 part by weight of water, ½ part by weight of potassium hydroxide and 1½ parts by weight of ferric oxide,
   a second homogeneous mixture of 3½ parts by weight of glycerol, ½ part by weight of sucrose, ½ part by weight of ferric oxide, 1½ parts by weight of graphite and 3 parts by weight of kieselguhr, and
   a third homogeneous mixture comprising 8 parts by weight of a first sub-mix which itself comprises 22 parts by weight of glycerol, 21 parts by weight of water, 30 parts by weight of urea and 0.6 part by weight of ammonium carbonate;
   a second sub-mix which comprises the said 8 parts by weight of the first sub-mix together with 10 parts by weight of methyl violet; 6 parts by weight of a third sub-mix which itself comprises 17 parts by weight of stearic acid, 80 parts by weight of glycerol, 3 parts by weight of 10% aqueous ammonia solution and 12 parts by weight of water; and 0.2 part by weight of zinc stearate, 6 parts by weight of sulphur and 1 part by weight of accelerator, all said homogeneous mixtures being dispersed throughout the rubber.

10. The method of preparing the self-inking material of claim 6 comprising the steps:
    masticating together said synthetic polyisoprene and natural rubber, grinding and mixing to homogeneity said first homogeneous mixture containing potassium hydroxide and ferric oxide, and masticating same into the rubber,
    grinding and mixing to homogeneity a second mixture containing glycerol, sucrose, ferric oxide, and kieselguhr, and masticating same into the rubber,
    forming a third homogeneous mixture by firstly forming a first sub-mix by heating and mixing to homogeneity glycerol, water, urea and ammonium carbonate; cooling said first sub-mix and mixing with methyl violet to thereby form a second sub-mix; forming a third sub-mix by heating and mixing to homogeneity stearic acid, glycerol, aqueous ammonia solution and water, cooling said third sub-mix; and forming a fourth sub-mix by mixing together to homogeneity zinc stearate, sulphur, accelerator, said second sub-mix and said third sub-mix, and masticating the third homogeneous mixture into the rubber.

11. The method of preparing the self-inking material of claim 3 comprising the steps:
    masticating together synthetic polyisoprene and natural rubber,
    grinding and mixing to homogeneity a mixture containing potassium hydroxide and ferric oxide, and after mixing, masticating same into the rubber at a temperature of about 90° F.,
    grinding and mixing to homogeneity a mixture containing glycerol, sucrose, ferric oxide, and kieselguhr, and masticating into the rubber at a temperature of about 90° F.,
    forming a first sub-mix by heating and mixing to homogeneity glycerol, water, urea and ammonium carbonate, cooling said first sub-mix and mixing with methyl violet to thereby form a second sub-mix, forming a third sub-mix by heating and mixing to homogeneity stearic acid, glycerol, aqueous ammonia solution and water, cooling said third sub-mix, and forming a fourth sub-mix by mixing together to homogeneity zinc stearate, sulphur, accelerator, said second sub-mix and said third sub-mix, and masticating into the rubber at ambient temperature.

12. The method of preparing the self-inking material of claim 3 comprising the steps:
    masticating together 17 parts by weight of synthetic polyisoprene rubber and 3 parts by weight of natural rubber,
    grinding and mixing to homogeneity one part by weight of water, 0.5 part by weight of potassium hydroxide and 1.5 parts by weight of ferric oxide, and after mixing masticating same into the rubber at a temperature of about 90° F.,
    grinding and mixing to homogeneity 3 parts by weight of glycerol, ½ part by weight of sucrose, ½ part by weight of ferric oxide, 1½ parts by weight of graphite and 3 parts by weight of kieselguhr, and masticating same into the rubber at a temperature of about 90° F.,
    forming a first sub-mix by heating and mixing to homogeneity 18 parts by weight of glycerol, 21 parts by weight of water, 30 parts by weight of urea and 0.6 part by weight of ammonium carbonate; cooling 8 parts by weight of said first sub-mix and mixing with 10 parts by weight of methyl violet to thereby form a second sub-mix; forming a third sub-mix by heating and mixing to homogeneity 17 parts by weight of stearic acid, 70 parts by weight of glycerol, 3 parts by weight of 10% aqueous ammonia solution and 12 parts by weight of water; cooling 6 parts by weight of said third sub-mix; and forming a fourth sub-mix by mixing together to homogeneity 0.2 part by weight of zinc stearate, 6 parts by weight of sulphur, 1 part by weight of accelerator, all of said second sub-mix and said 6 parts by weight of said third sub-mix; and masticating into the rubber at ambient temperature.

References Cited

UNITED STATES PATENTS

| | | | |
|---|---|---|---|
| 2,022,887 | 12/1935 | Kiernan | 260—764 |
| 2,149,211 | 2/1939 | Fischer | 260—764 |
| 2,267,620 | 12/1941 | Cassel | 260—764 |
| 3,019,201 | 1/1962 | Clancy et al. | 101—327 |

MURRAY TILLMAN, *Primary Examiner.*

M. J. TULLY, *Assistant Examiner.*